(12) United States Patent
De Mel et al.

(10) Patent No.: US 10,922,360 B2
(45) Date of Patent: Feb. 16, 2021

(54) ANCILLARY SPEECH GENERATION VIA QUERY ANSWERING IN KNOWLEDGE GRAPHS

(71) Applicant: INTERNATIONAL BUSINESS MACHINES CORPORATION, Armonk, NY (US)

(72) Inventors: Geeth R. De Mel, Warrington (GB); Douglas M. Freimuth, New York, NY (US); James R. Kozloski, New Fairfield, CT (US); Clifford A. Pickover, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 550 days.

(21) Appl. No.: 15/690,835

(22) Filed: Aug. 30, 2017

(65) Prior Publication Data
US 2019/0065627 A1 Feb. 28, 2019

(51) Int. Cl.
*G06F 16/9038* (2019.01)
*G10L 13/00* (2006.01)
(Continued)

(52) U.S. Cl.
CPC ...... *G06F 16/9038* (2019.01); *G06F 16/3349* (2019.01); *G06F 16/90332* (2019.01);
(Continued)

(58) Field of Classification Search
CPC ............. G06F 16/9038; G06F 16/3349; G06F 16/90332; G06F 16/9535; G06F 17/2795;
(Continued)

(56) References Cited

U.S. PATENT DOCUMENTS 5,404,506 A 4/1995 Fujisawa et al.
5,897,632 A 4/1999 Dar et al.
(Continued)

FOREIGN PATENT DOCUMENTS

WO 0237250 A2 5/2002
WO 0237474 A1 5/2002

OTHER PUBLICATIONS

Hussain et al. "Incorporating Weather Updates for Public Transportation Users of Recommendation Systems," 2016 17th IEEE International Conference on Mobile Data Management (MDM), Porto, 2016, pp. 333-336, doi: 10.1109/MDM.2016.57. (Year: 2016).*
(Continued)

*Primary Examiner* — James E Richardson
(74) *Attorney, Agent, or Firm* — Robert D. Bean

(57) ABSTRACT

According to one embodiment, a method, computer system, and computer program product for ancillary speech generation is provided. The present invention may include receiving a query from a querent; interpreting the terms of the query using schema information; rewriting the initial query into a set of related queries; pruning related queries that are irrelevant based on contemporary circumstances; retrieving preferences associated with the querent, where each of the preferences is assigned a weight representing the importance of that preference to the querent; filtering out the pruned related queries that do not comport with the querent's preferences; sort the filtered related queries according to the weight of the preferences served by each query; answering the filtered related queries with a knowledge graph; returning answers to the querent; and updating the preferences based on the answers.

18 Claims, 6 Drawing Sheets

(51) Int. Cl.
  *G06F 16/9535* (2019.01)
  *G06F 16/9032* (2019.01)
  *G06F 16/33* (2019.01)
  *G06F 40/30* (2020.01)
  *G06F 40/247* (2020.01)
  *G06F 40/295* (2020.01)
(52) U.S. Cl.
  CPC ........ *G06F 16/9535* (2019.01); *G06F 40/247* (2020.01); *G06F 40/295* (2020.01); *G06F 40/30* (2020.01); *G10L 13/00* (2013.01)
(58) Field of Classification Search
  CPC .... G06F 17/278; G06F 17/2785; G06F 40/30; G06F 40/247; G06F 40/295; G10L 13/00
  See application file for complete search history.

(56) References Cited

U.S. PATENT DOCUMENTS

| | | | |
|---|---|---|---|
| 6,199,063 | B1 | 3/2001 | Colby et al. |
| 7,440,963 | B1 | 10/2008 | Bello et al. |
| 9,378,203 | B2 | 6/2016 | Sweeney et al. |
| 2004/0243395 | A1 | 12/2004 | Gluzberg et al. |
| 2006/0026154 | A1 | 2/2006 | Altinel et al. |
| 2007/0294229 | A1 | 12/2007 | Au |
| 2008/0172360 | A1 | 7/2008 | Lim et al. |
| 2011/0055240 | A1 | 3/2011 | Li et al. |
| 2011/0167077 | A1* | 7/2011 | Govani ............... G06F 16/9537 707/767 |
| 2012/0166371 | A1 | 6/2012 | Sweeney et al. |
| 2013/0111348 | A1* | 5/2013 | Gruber ............... H04M 1/72597 715/727 |
| 2014/0136197 | A1* | 5/2014 | Mamou ................... G10L 15/08 704/235 |
| 2015/0019228 | A1* | 1/2015 | Akolkar ............... G06F 16/3344 704/270.1 |
| 2015/0052171 | A1* | 2/2015 | Cheung .................. G06F 16/29 707/771 |
| 2015/0294029 | A1* | 10/2015 | Sanghai ............ G06F 16/90328 707/732 |
| 2016/0063118 | A1* | 3/2016 | Campbell ........... G06F 16/9535 |
| 2017/0243107 | A1* | 8/2017 | Jolley .................... G06N 3/006 |
| 2018/0068031 | A1* | 3/2018 | Hewavitharana ...... G06N 3/006 |
| 2018/0121508 | A1* | 5/2018 | Halstvedt ............ G06F 16/3344 |
| 2018/0349377 | A1* | 12/2018 | Verma .................. G06N 3/0454 |

OTHER PUBLICATIONS

Mell et al., "The NIST Definition of Cloud Computing," National Institute of Standards and Technology, Sep. 2011, p. 1-3, Special Publication 800-145.

IBM, "IBM Watson—Build Your Cognitive Business with IBM", https://www.ibm.com/watson, accessed on Aug. 29, 2017, pp. 1-7.

IBM, "IBM Debating Technologies—IBM", http://researcher.watson.ibm.com/researcher/view_group.php?id=5443, accessed on Aug. 29, 2017, pp. 1-4.

Porkaew et al., "Query Reformulation for Content Based Multimedia Retrieval in MARS", IEEE International Conference on multimedia Computing and Systems, Jun. 7-11, 1999, Florence, Italy, pp. 747-751.

Biancalana et al., "Social Tagging in Query Expansion: a New Way for Personalized Web Search", International Conference on Computational Science and Engineering, 2009. CSE '09, Aug. 29-31, 2009, Vancouver, BC, Canada, pp. 1060-1065.

Duff et al., "An Architecture for Spoken Dialogue Management", Fourth International Conference on Spoken Language, 1996, ICSLP 96, Oct. 3-6, 1996, Philadelphia, PA, pp. 1025-1028.

Thiel et al., "Intelligent E-Commerce with Guiding Agents Based on Personalized Interaction Tools", E-Business Applications, Advanced Information Processing book series (AIP), Chapter 5: Intelligent E-Commerce with Guiding Agents, Springer, Berlin, Heidelberg, (2003), pp. 61-76.

* cited by examiner

ANCILLARY SPEECH GENERATION VIA QUERY ANSWERING IN KNOWLEDGE GRAPHS

BACKGROUND

The present invention relates, generally, to the field of computing, and more particularly to natural language understanding.

Natural language understanding is a field of computing concerned with in-context interactions between computers and humans using natural languages. As computing power has become cheaper, faster, and more powerful, many companies are rushing to develop personal assistants capable of communicating with humans using natural language for phones, tablets, computer operating systems and even purpose-built home automation appliances to provide intuitive machine-man interfacing. As such, the field of natural language processing has massively grown in relevance in recent years, and streamlining the process is of immense commercial importance. A primary goal of the field is to enable computers to process and reply to user questions or comments in a natural fashion. Achieving this goal requires that computers be able to parse the remark and return a reply that is contextually relevant. Consequently, an understanding of natural language requires an understanding of the context within which that language appears, which complicates the process of creating natural language processors that can successfully engage in natural language interactions.

SUMMARY

According to one embodiment, a method, computer system, and computer program product for ancillary speech generation is provided. The present invention may include receiving a query from a querent; interpreting the terms of the query using schema information; rewriting the initial query into a set of related queries; pruning related queries that are irrelevant based on contemporary circumstances; retrieving preferences associated with the querent, where each of the preferences is assigned a weight representing the importance of that preference to the querent; filtering out the pruned related queries that do not comport with the querent's preferences; sort the filtered related queries according to the weight of the preferences served by each query; answering the filtered related queries with a knowledge graph; returning answers to the querent; and updating the preferences based on the answers.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
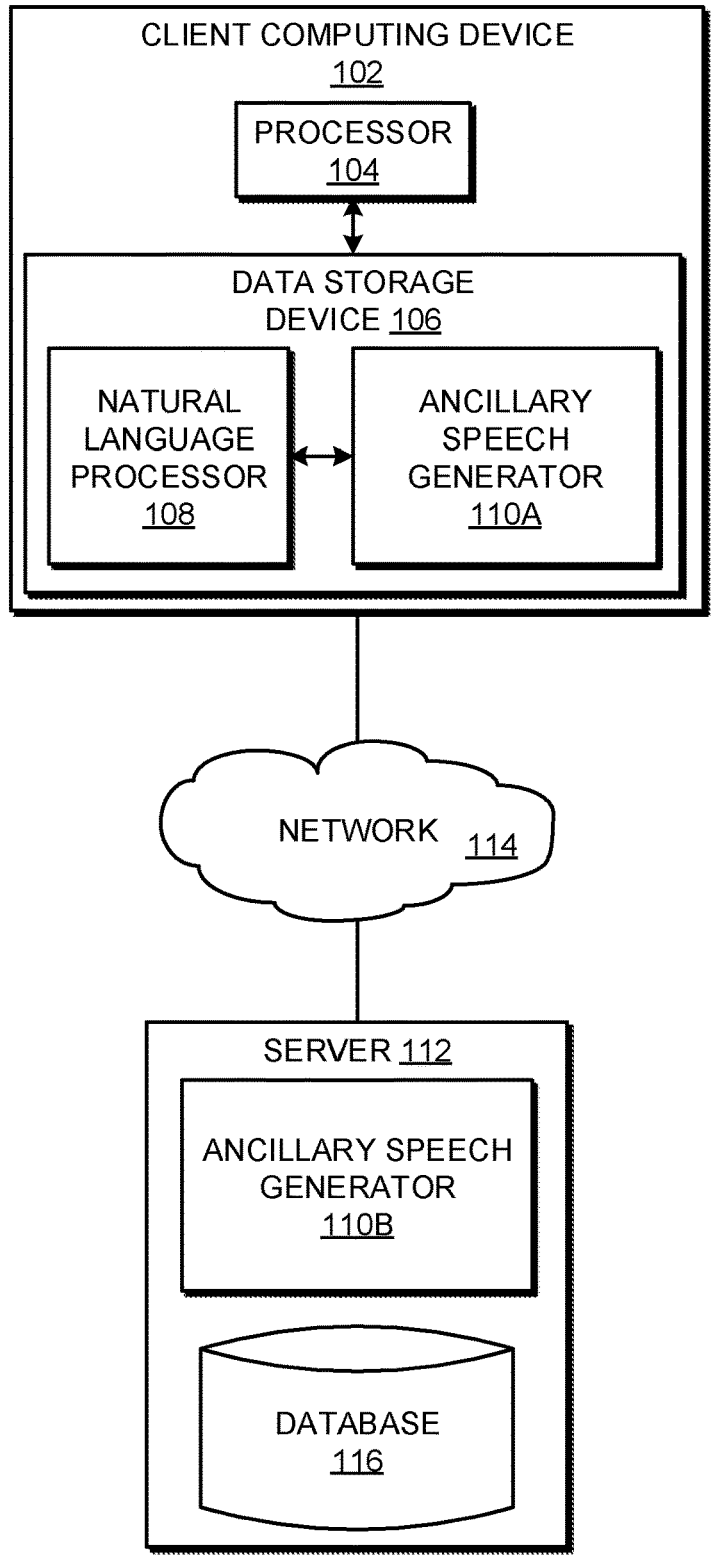
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to natural language understanding. The following described exemplary embodiments provide a system, method, and program product to, among other things, accept user queries for which a natural language processing program has no confident answer, assemble reformulated queries based on context clues, prune reformulated queries that do not match user interests, and provide an answer using a knowledge graph. Therefore, the present embodiment has the capacity to improve the technical field of natural language understanding by providing contextually accurate responses to user remarks even where a natural language processing program may not have a confident answer to the user remark, thereby increasing the number of questions the natural language processor may be capable of responding to, and improving the ability of the natural language processor to interface with users in an organic manner.

As previously described, natural language understanding is a field of computing concerned with in-context interactions between computers and humans using natural languages. As computing power has become cheaper, faster, and more powerful, many companies are rushing to develop personal assistants capable of communicating with humans using natural language for phones, tablets, computer operating systems and even purpose-built home automation appliances to provide intuitive machine-man interfacing. As such, the field of natural language processing has massively grown in relevance in recent years, and streamlining the process is of immense commercial importance. A primary goal of the field is to enable computers to process and reply to user questions or comments in a natural fashion. Achieving this goal requires that computers be able to parse the remark and return a reply that is contextually relevant. Consequently, an understanding of natural language requires an understanding of the context within which that language appears, which complicates the process of creating natural language processors that can successfully engage in natural language interactions.

With the advent of home automation systems, such as Google Home® (Google Home® and all Google Home®-based trademarks and logos are trademarks or registered trademarks of Google Inc. and/or its affiliates), Amazon Echo® (Amazon Echo® and all Amazon Echo®-based trademarks and logos are trademarks or registered trademarks of Amazon Technologies, Inc. and/or its affiliates), and Siri® (Siri® and all Siri®-based trademarks and logos are trademarks or registered trademarks of Apple Inc. and/or its affiliates), people have become accustomed to engaging in conversations with computer systems to accomplish tasks, such as changing temperature, turning on lights, fetching information on the weather, playing music, and more. Though modern systems are capable at processing voice-to-text, distinguishing users, and retrieving information for directly accessible questions, modern voice assistants lack capabilities when the questions are ambiguous or when the systems do not have access to information to answer the questions; attempts to address this deficiency in the art using query generalization often generalize the question too much, thereby presenting the users with a large amount of false hits. As such, it may be advantageous to, among other things, implement a system that approximates the answers in situations where the question is ambiguous or information is unavailable without diverging significantly from the original question.

According to one embodiment, the invention is a method of assisting a user to obtain needed information from a knowledge graph which otherwise would not be possible, by reformulating the initial query with regard to underlying schema information tempered by the relevant data distributions in the graph, and the user's ever-evolving preference model.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to accept user queries for which a natural language processing program has no confident answer, assemble reformulated queries based on context clues, prune reformulated queries that do not match user interests, and provide an answer using a knowledge graph.

Referring to FIG. 1, an exemplary networked computer environment 100 is depicted, according to at least one embodiment. The networked computer environment 100 may include client computing device 102 and a server 112 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and an ancillary speech generation program 110A and communicate with the server 112 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 4, the client computing device 102 may include internal components 402a and external components 404a, respectively.

The server computer 112 may be a laptop computer, netbook computer, personal computer (PC), a desktop computer, or any programmable electronic device or any network of programmable electronic devices capable of hosting and running an ancillary speech generation program 110B and a database 116 and communicating with the client computing device 102 via the communication network 114, in accordance with embodiments of the invention. As will be discussed with reference to FIG. 4, the server computer 112 may include internal components 402b and external components 404b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

Natural language processor 108 may be any computer program or combinations of computer programs capable of accepting natural language as an input and processing natural language into a state that is computer-readable, and may further be capable of performing actions or serving requests derived from the natural language input, such as answering queries or responding to remarks. The natural language processor 108 may serve as part of a medical treatment recommendation system, such as IBM Watson® (IBM Watson® and all IBM Watson®-based trademarks and logos are trademarks or registered trademarks of International Business Machines Corporation and/or its affiliates), where co-reference resolution is conducted, or natural language processing pipeline 108 may be in a dialogue manager, such as Siri®, that determines related entities to better generate a system response.

According to the present embodiment, the ancillary speech generation program 110A, 110B may be a program capable of accepting user queries for which a natural language processing program has no confident answer, assemble reformulated queries based on context clues, prune reformulated queries that do not match user interests, and provide an answer using a knowledge graph. The ancillary speech generation program 110A, 110B may be a standalone program, or may be used in conjunction with one or more natural language processors 108. In an alternate embodiment, ancillary speech generation program 110A, 110B may be in communication with human interface devices, such as audio sensors for detecting spoken natural language queries, keyboards for receiving natural language queries via text, and/or cameras for interpreting gestures or movement. The ancillary speech generation method is explained in further detail below with respect to FIG. 2.

Figure 2:
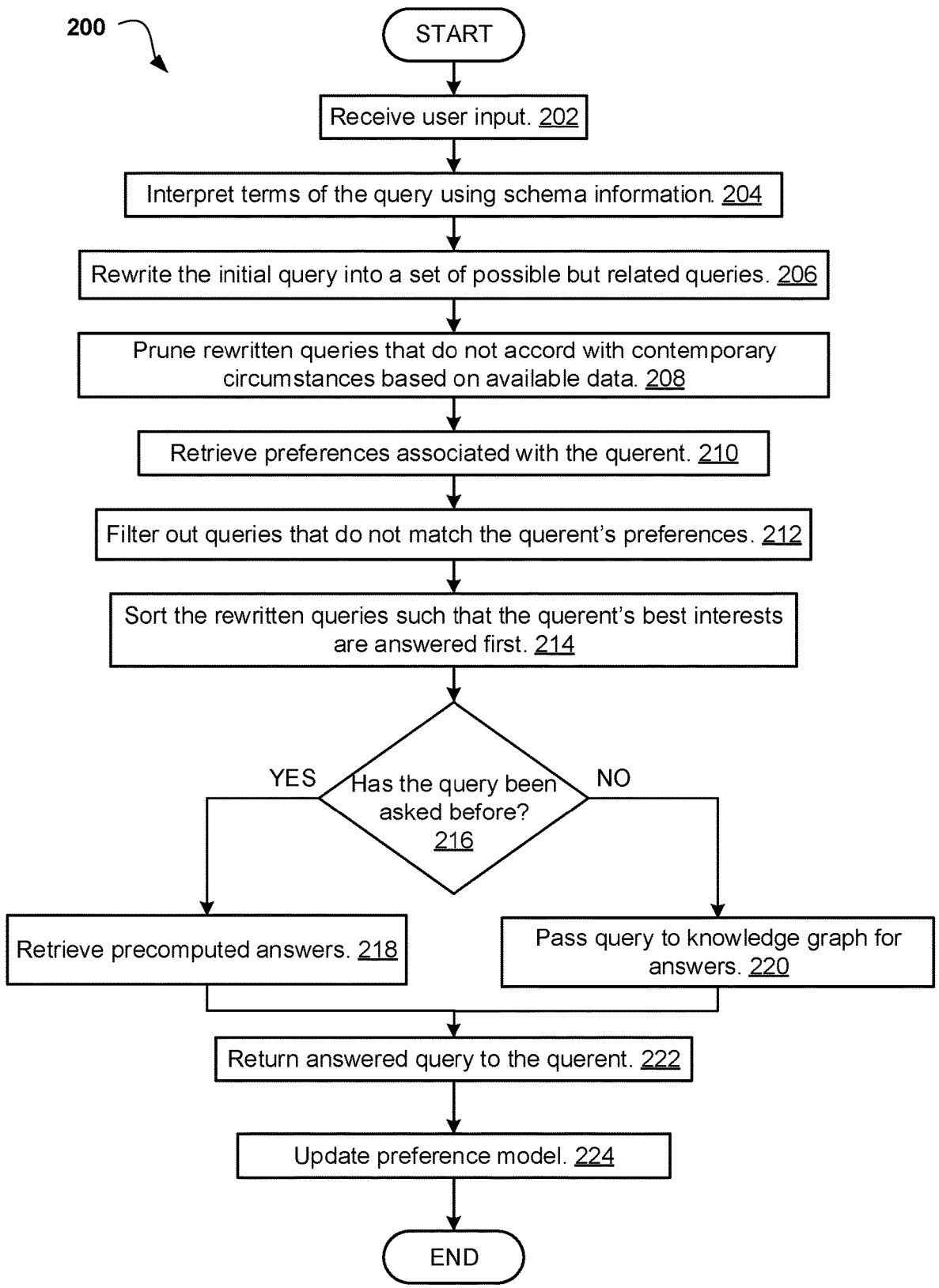
FIG. 2 is an operational flowchart illustrating an ancillary speech generation process according to at least one embodiment.

Referring now to FIG. 2, an operational flowchart illustrating an ancillary speech generation process 200 is depicted according to at least one embodiment. At 202, the ancillary speech generation program 110A, 110B receives a user input. This input may be in the form of a query made by a user, or 'querent'; a query may be a question, such as "what are the scores of the latest game," or a remark, such as "(voice assistant), things were better in the good old days." An 'answer' may be specifically an answer to a question or an answer to a remark. This user input may be supplied by natural language processor 108, or by any sensor, human interface device, or program in communication with network 114. As an example, an elderly querent may be using natural language processor as a home companion; the querent may be reminiscing about the "good old days," or may ask a question regarding baseball, politics, movies, et cetera; if natural language processor 108 cannot give a confident answer, either because information is lacking, the query is vague, or the natural language processor 108 is unsure how to respond to a remark about the "good old days," natural language processor 108 may send the query to ancillary speech generation program 110A, 110B.

Next, at 204, ancillary speech generation program 110A, 110B interprets the terms of the query using schema information. The schema represents entities and their associated properties for a domain. For example, a person is an 'entity' and the age, jobs, friend circle, etc. are 'properties' (also referred to as 'relationships') describing the entity. The schema is the representation of the ontology; the ontology is the shared conceptualization of the domain. While standard ontologies exist in repositories from which ancillary speech generation program 110A, 110B may retrieve schema, ontologies may also be automatically generated from domain corpora using, for instance, the IBM® research tool Bluehound® (IBM Bluehound® and all IBM Bluehound®-based trademarks and logos are trademarks or registered trademarks of International Business Machines Corporation and/or its affiliates). The schema information may be located anywhere accessible by ancillary speech generation program 110A, 110B, which may be any data repository in communication with network 114. This may include data storage device 106, or database 116. It may also include any information on the internet. The ancillary speech generation program 110A, 110B may particularly focus on ontological information associated with the knowledge graph to interpret the terms of the query.

Then, at 206, ancillary speech generation program 110A, 110B rewrites the initial query into a set of possible but related queries. For example, for a query, such as "what are the latest scores," where the game is not specified, ancillary speech generation program 110A, 110B may identify a game by means of a set of sports, containing baseball, football, and volleyball; ancillary speech generation program 110A, 110B may then rewrite the initial query into a set of possible but related queries pertaining to baseball, football, and volleyball.

Next, at 208, ancillary speech generation program 110A, 110B prunes rewritten queries that do not accord with contemporary circumstances based on available data. Available data on contemporary circumstances may be information that is relevant to the salience of a query with regard to a querent's current environment or situation, such as seasonal events, current news, weather, et cetera. This data may be provided by access to the internet or other networks, or may be provided by user input, apps, websites, or other such sources. Queries that are irrelevant or incorrect in the light of such available data may be pruned from the set of rewritten queries. Continuing the previous example, ancillary speech generation program 110A, 110B may rewrite the initial query into a set of possible but related queries pertaining to baseball, football, and volleyball, but may learn that volleyball is currently not in season; thus, no current information about volleyball may be available. In such a case, ancillary speech generation program 110A, 110B may prune out all queries pertaining to volleyball, leaving a query set that only contains queries about baseball and football.

Then, at 210, ancillary speech generation program 110A, 110B retrieves preferences associated with the querent. These preferences may be entered by the querent manually, and may be imported from other programs or obtained from data repositories on the network 114 or from websites on the internet, such as social media websites. These preferences may include any information that may indicate the relevance of schema information to the querent's interests, to help ancillary speech generation program 110A, 110B determine which schema information may be relevant to include in a given query, and what schema information may not be relevant. This information may include geographical location, date, age, favorite color, shoe size, favorite food, recent purchases, state of health, and favorite sport.

Next, at 212, ancillary speech generation program 110A, 110B filters out queries that do not match the querent's preferences. For example, if the querent is a Chicago native, ancillary speech generation program 110A, 110B may deduce that the querent is not interested in games relating to Boston, and may therefore filter out reformulated queries pertaining to the New England Patriots® (New England Patriots® and all New England Patriots®-based trademarks and logos are trademarks or registered trademarks of NEW ENGLAND PATRIOTS L.P. and/or its affiliates) football team or the Boston Red Sox® (Boston Red Sox® and all Boston Red Sox®-based trademarks and logos are trademarks or registered trademarks of the Boston Red Sox Baseball Club Limited Partnership and/or its affiliates) baseball team. In another example, the ancillary speech generation program 110A, 110B may either have the information directly or may infer from past querying history or some other related information that the querent has no preference for football; consequently, ancillary speech generation program 110A, 110B may filter out all reformulated questions pertaining to football.

Then, at 214, ancillary speech generation program 110A, 110B sorts the rewritten queries such that the querent's best interests are answered first. The ancillary speech generation program 110A, 110B may sort the rewritten queries by assigning a weight to certain preferences, and arranging the queries from most to least suitable depending on the weight; this weight may be affected by user preferences, data about the state of the world, query history of the querent or any other user, or any other information available to ancillary speech generation program 110A, 110B that may aid in enumerating the relevance of any given query to the querent's interests. For example, if the querent is a Chicago native, ancillary speech generation program 110A, 110B may deduce that the querent is interested in games related to Chicago; ancillary speech generation program 110A, 110B may therefore further reformulate the question set to state that any scores in which the Chicago Cubs® (Chicago Cubs® and all Chicago Cubs®-based trademarks and logos are trademarks or registered trademarks of Chicago National League Ball Club, Inc. and/or its affiliates) baseball team or the Chicago Bears® (Chicago Bears® and all Chicago Bears®-based trademarks and logos are trademarks or registered trademarks of Chicago Bears Football Club, Inc. and/or its affiliates) football team are involved would be a suitable solution to the initial query; the ancillary speech generation program 110A, 110B may further interpret the query with regard to other data sources such as seasonality, weather, and so forth. For example, if the original question was asked in June, Chicago Cubs® games may take precedence over Chicago Bears® as the current sports season is for baseball; the opposite could be said if the question is asked in December, as that would be the season for football, and post-season for baseball. If the question is asked in September, ancillary speech generation program 110A, 110B may consider a strategy based on a weighted sum of querents' past queries, and the querent's social media profile. For example, through the social media analysis and the recent queries, ancillary speech generation program 110A, 110B may learn to put more weight into baseball. In an alternate embodiment, answers may be passed piecemeal to the knowledge graph in partitions sufficient to engage the user and generate conversation. For example, the system may have a "throttle" that passes N alternate queries to the knowledge graph, where N is a diameter enumerating the meandering of ancillary language, and can be controlled based on user interest, engagement, and tolerance for meandering.

In an alternate embodiment, ancillary speech generation program 110A, 110B may be capable of degrading the information associated with the querent in terms of its weight. This capability would allow ancillary speech generation program 110A, 110B to account for a querent's changing preferences over time, due to such factors as experiences, social circle, and time of year. For example, the querent may be interested in baseball in summer but may be interested in football or snowboarding over the winter period. The ancillary speech generation program 110A, 110B may account for changing preferences by employing a reinforcement learning mechanism in which current queries posted by the querent and the reformulated queries selected by the querent may be used to select the querent's current preferences for subsequent queries, an optimization mechanism to update the weights associated with the preferences of the querent, and a mechanism that updates querent's preferences based on the insights gleaned from the querent's social media profile.

Next, at 216, the ancillary speech generation program 110A, 110B determines whether the query has been asked before. The ancillary speech generation program 110A, 110B may make this determination by checking a list of previously asked questions, which may be stored in a data repository, such as data storage device 106 or database 116. According to one implementation, if the ancillary speech generation program 110A, 110B determines that the query has been asked before (step 216, "YES" branch), the ancillary speech generation program 110A, 110B may continue to step 218 to retrieve the precomputed answers from the knowledge graph. If the ancillary speech generation program 110A, 110B determines that the question has not been asked before (step 216, "NO" branch), the ancillary speech generation program 110A, 110B may continue to step 220 to pass the query to the knowledge graph for answers. In one embodiment of the invention, queries that have been asked before but are now outdated may be passed to step 220 to be answered anew by the knowledge graph, using updated information.

At 218, ancillary speech generation program 110A, 110B retrieves precomputed answers. The precomputed answers may be stored in a data repository, such as data storage device 106 or database 116, and may be stored with the previously asked questions. The ancillary speech generation program 110A, 110B may use ontological knowledge to perform query subsumption in order to perform the query matching. Query subsumption is the classification of query object classes from the general to the specific. Precomputed answers may be retrieved exactly as they were stored. In an alternate embodiment, the precomputed answer may be updated with current information. Once a precomputed answer has been retrieved by the knowledge graph, ancillary speech generation program 110A, 110B may move to step 222 to return the answered query to the querent.

At 220, ancillary speech generation program 110A, 110B passes the query to knowledge graph for answers. The knowledge graph may be a network of entities, each of which is represented as a node, as well as such entities' semantic types, properties, and the relationships between the entities, each represented as an edge between the related nodes; for example, "John Doe" may be a node, and A Corp. may be a node; if John Doe works for A Corp., the employee/employer relationship between the John Doe node and the A Corp. node would be represented by an edge. The knowledge graph may be generated from the schema information provided by the ontology. The ancillary speech generation program 110A, 110B computes the answer by selecting nodes relevant to the query within the knowledge graph, and by selecting edges within the knowledge graph based on their relevance to the node. The ancillary speech generation program 110A, 110B may also select an edge based on other criteria, for instance querent information, such as the risk value for the querent (for example, a person with pre-Alzheimer's or on the autism spectrum may benefit from specifically worded answers), or real-time cognitive feedback from the querent. The real-time cognitive feedback may be based on such factors as facial expressions, vocal cues, biometrics, physical movements, stance, number of individuals present, etc. From this feedback ancillary speech generation program 110A, 110B may infer such information as state of mind (for example, the querent seems happy, nervous, sleepy, distracted), user activity, and personality. The ancillary speech generation program 110A, 110B may use this real-time cognitive feedback to determine when to stop talking, what topics ought to be avoided, and may be used to guide the speed, or substance of the query answer in response to the querent's mental state or personality (for example, changing the topic of conversation when the user is nervous). This real-time cognitive feedback may also be stored and used to update the querent's preferences. Furthermore, ancillary speech generation program 110A, 110B may interface with the querent using audible or written speech, and/or may employ an avatar (an electronic image that represents and is manipulated by ancillary speech generation program 110A, 110B or natural language processor 108). The ancillary speech generation program 110A, 110B may employ real-time cognitive feedback to alter its affect (for example, the personality, voice, or speaking pattern of ancillary speech generation program 110A, 110B's speech), or avatar appearance (for example, the appearance, facial expression, gait, pose, gesturing, clothing). The real-time cognitive feedback may be gathered by a sensor, such as a camera or microphone. Once an answer has been computed by the knowledge graph, ancillary speech generation program 110A, 110B may move to step 222 to return the answered query to the querent. In an alternate embodiment, changes in an avatar or affect may be triggered by natural language processor 108 triggering ancillary speech generation program 110A, 110B.

Then, at 222, ancillary speech generation program 110A, 110B returns the answered query to the querent. The answer may be communicated via text or speech, and may be augmented through use of an avatar. The ancillary speech generation program 110A, 110B may directly communicate the answer to the querent, or may simply pass the answer to natural language processor 108 to communicate to the querent. The answered query to be returned may be only the querent that is considered to be most relevant to the querent's interests, or it may be any number of answered queries. If more than one answered queries are to be returned, ancillary speech generation program 110A, 110B may combine the answered queries into one answer, may ask the querent if their query has been sufficiently answered and return the next answered query if the querent judges the first to be an insufficient response, or may present all answered queries at once.

Next, at 224, ancillary speech generation program 110A, 110B updates the preference model. Based on the order in which the querent consumes the queries and results, the system may further learn about the querent's current preferences, and updates the preference model accordingly for subsequent queries. The ancillary speech generation program 110A, 110B may accomplish this by employing a reinforcement learning whereby current queries are posted by the querent, and the reformulated queries selected by the querent may be used to learn his/her current preferences. The ancillary speech generation program 110A, 110B may also use an optimization method to update the weights associated with the preferences of the querents, and may update the querent's preferences based on the insights gleaned from the querent's social media profile.

Figure 3:
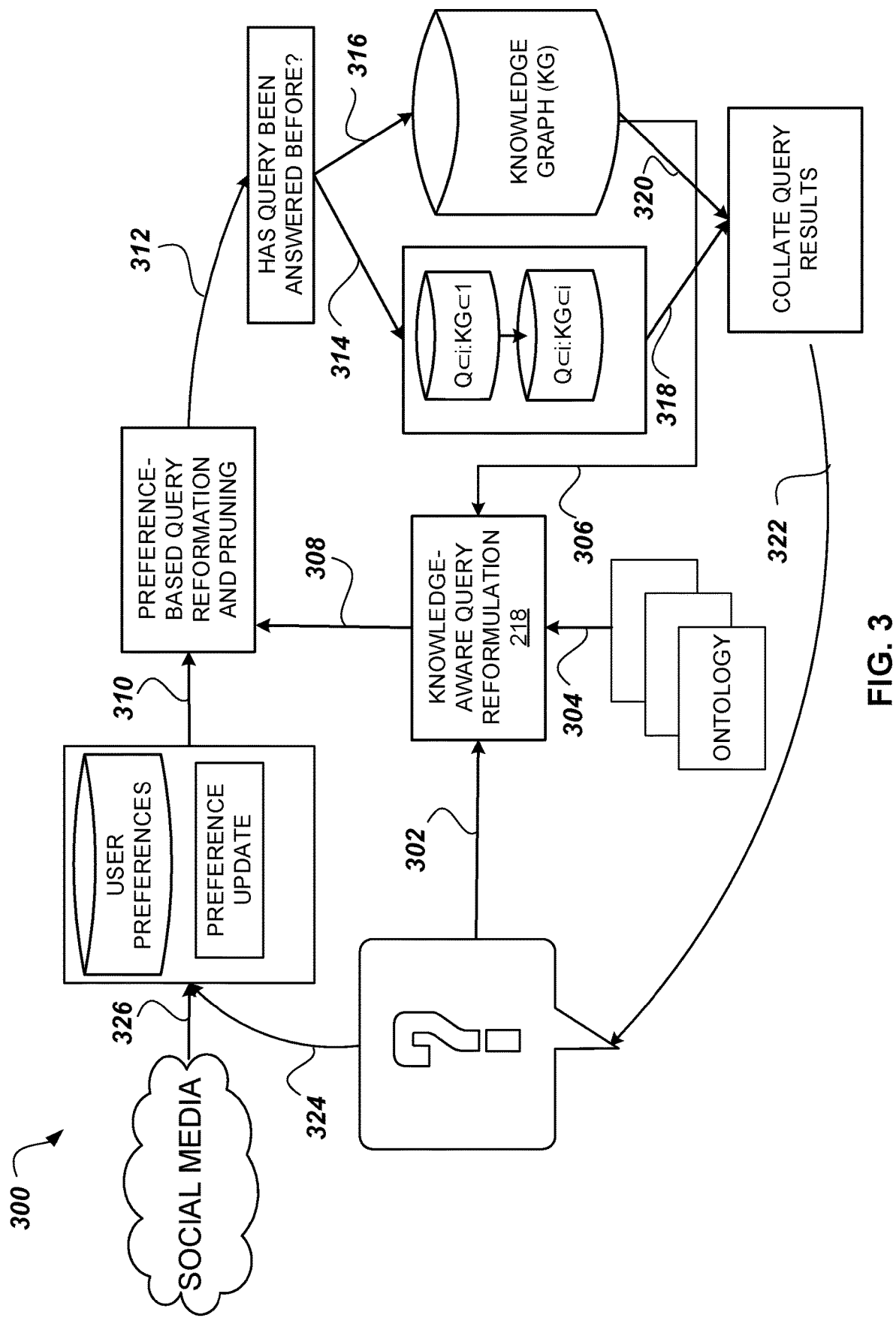
FIG. 3 is a process block diagram illustrating the components of the ancillary speech generation process according to at least one embodiment.

FIG. 3 is a process block diagram illustrating the components of the ancillary speech generation process 300 according to at least one embodiment. At 302, when a query "Q" is submitted to the system by a querent, for instance "what are the latest scores for the game," the query may be sent to the knowledge-aware query reformulation module. The knowledge-aware query reformulation method may use schema information, especially the ontological information associated with the knowledge graph, to interpret the terms of the query; the schema information may be provided to the knowledge aware query reformulation method from the ontology, at 304, and the data distribution may be provided to the knowledge aware query reformulation method from the knowledge graph, at 306. In response to the information provided from the ontology and the knowledge graph, the knowledge-aware query reformulation method may rewrite the query into a set of possible but related queries. At 308 this set of reformulated queries may be provided to the preference-based query reformation and pruning method. At 310, the preference based query reformulation and pruning method may retrieve user preferences associated with the querent; the preference-based query reformulation and pruning method may then filter out queries that do not match the querent's interests, and may sort the reformulations such that the querent's best interests are the first to be answered by the knowledge graph. The set of pruned and sorted queries may be passed, at 312, to a method that checks whether each query of the set has been asked before. If a query has been asked before, the system may execute step 314 to directly retrieve the precomputed answers from the knowledge graph. If a query has not been asked before, the system may execute step 316 to pass the query to the knowledge graph for answers. At 318 and 320, the respective answers from each branch may be passed to a module that collates the results of the query. At 322, these results may then be passed back to the querent. Based on the order in which the querent consumes the queries and results, the system may further learn about the querent's current preferences, and these preferences may be passed, at 324, to update the stored user preferences for subsequent queries. At 326, information from the querent's social media may also be retrieved to update the querent's preferences.

It may be appreciated that FIGS. 2-3 provides only an illustration of one implementation and does not imply any limitations with regard to how different embodiments may be implemented. Many modifications to the depicted environments may be made based on design and implementation requirements. For example, in an alternate embodiment, the querent or system administrator may be provided with a means of disabling or suspending the ancillary speech generation program 110A, 110B.

Figure 4:
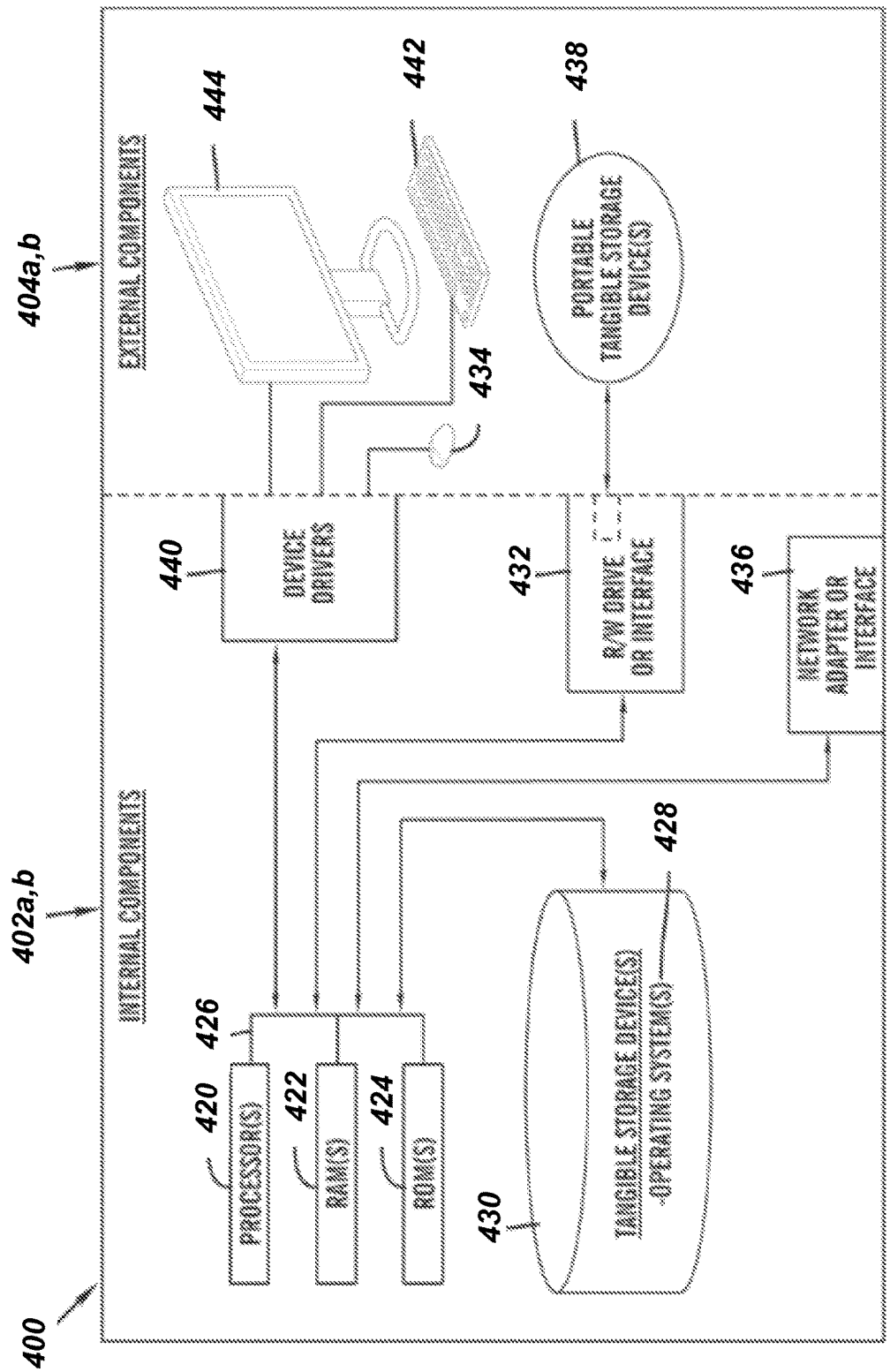
FIG. 4 is a block diagram of internal and external components of computers and servers depicted in FIG. 1 according to at least one embodiment.

FIG. 4 is a block diagram 400 of internal and external components of the client computing device 102 and the server 112 depicted in FIG. 1 in accordance with an embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

The data processing system 402, 404 is representative of any electronic device capable of executing machine-readable program instructions. The data processing system 402, 404 may be representative of a smart phone, a computer system, PDA, or other electronic devices. Examples of computing systems, environments, and/or configurations that may represented by the data processing system 402, 404 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 402 a,b and external components 404 a,b illustrated in FIG. 4. Each of the sets of internal components 402 include one or more processors 420, one or more computer-readable RAMs 422, and one or more computer-readable ROMs 424 on one or more buses 426, and one or more operating systems 428 and one or more computer-readable tangible storage devices 430. The one or more operating systems 428, the natural language processor 108 and the ancillary speech generation program 110A in the client computing device 102, and the ancillary speech generation program 110B in the server 112 are stored on one or more of the respective computer-readable tangible storage devices 430 for execution by one or more of the respective processors 420 via one or more of the respective RAMs 422 (which typically include cache memory). In the embodiment illustrated in FIG. 4, each of the computer-readable tangible storage devices 430 is a magnetic disk storage device of an internal hard drive. Alternatively, each of the computer-readable tangible storage devices 430 is a semiconductor storage device such as ROM 424, EPROM, flash memory or any other computer-readable tangible storage device that can store a computer program and digital information.

Each set of internal components 402 a,b also includes a R/W drive or interface 432 to read from and write to one or more portable computer-readable tangible storage devices 438 such as a CD-ROM, DVD, memory stick, magnetic tape, magnetic disk, optical disk or semiconductor storage device. A software program, such as the ancillary speech generation program 110A, 110B, can be stored on one or more of the respective portable computer-readable tangible storage devices 438, read via the respective R/W drive or interface 432, and loaded into the respective hard drive 430.

Each set of internal components 402 a,b also includes network adapters or interfaces 436 such as a TCP/IP adapter cards, wireless Wi-Fi interface cards, or 3G or 4G wireless interface cards or other wired or wireless communication links. The natural language processor 108 and the ancillary speech generation program 110A in the client computing device 102 and the ancillary speech generation program 110B in the server 112 can be downloaded to the client computing device 102 and the server 112 from an external computer via a network (for example, the Internet, a local area network or other, wide area network) and respective network adapters or interfaces 436. From the network adapters or interfaces 436, the software program 108 and the ancillary speech generation program 110A in the client computing device 102 and the ancillary speech generation program 110B in the server 112 are loaded into the respective hard drive 430. The network may comprise copper wires, optical fibers, wireless transmission, routers, firewalls, switches, gateway computers and/or edge servers.

Each of the sets of external components 404 a,b can include a computer display monitor 444, a keyboard 442, and a computer mouse 434. External components 404 a,b can also include touch screens, virtual keyboards, touch pads, pointing devices, and other human interface devices. Each of the sets of internal components 402 a,b also includes device drivers 440 to interface to computer display monitor 444, keyboard 442, and computer mouse 434. The device drivers 440, R/W drive or interface 432, and network adapter or interface 436 comprise hardware and software (stored in storage device 430 and/or ROM 424).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
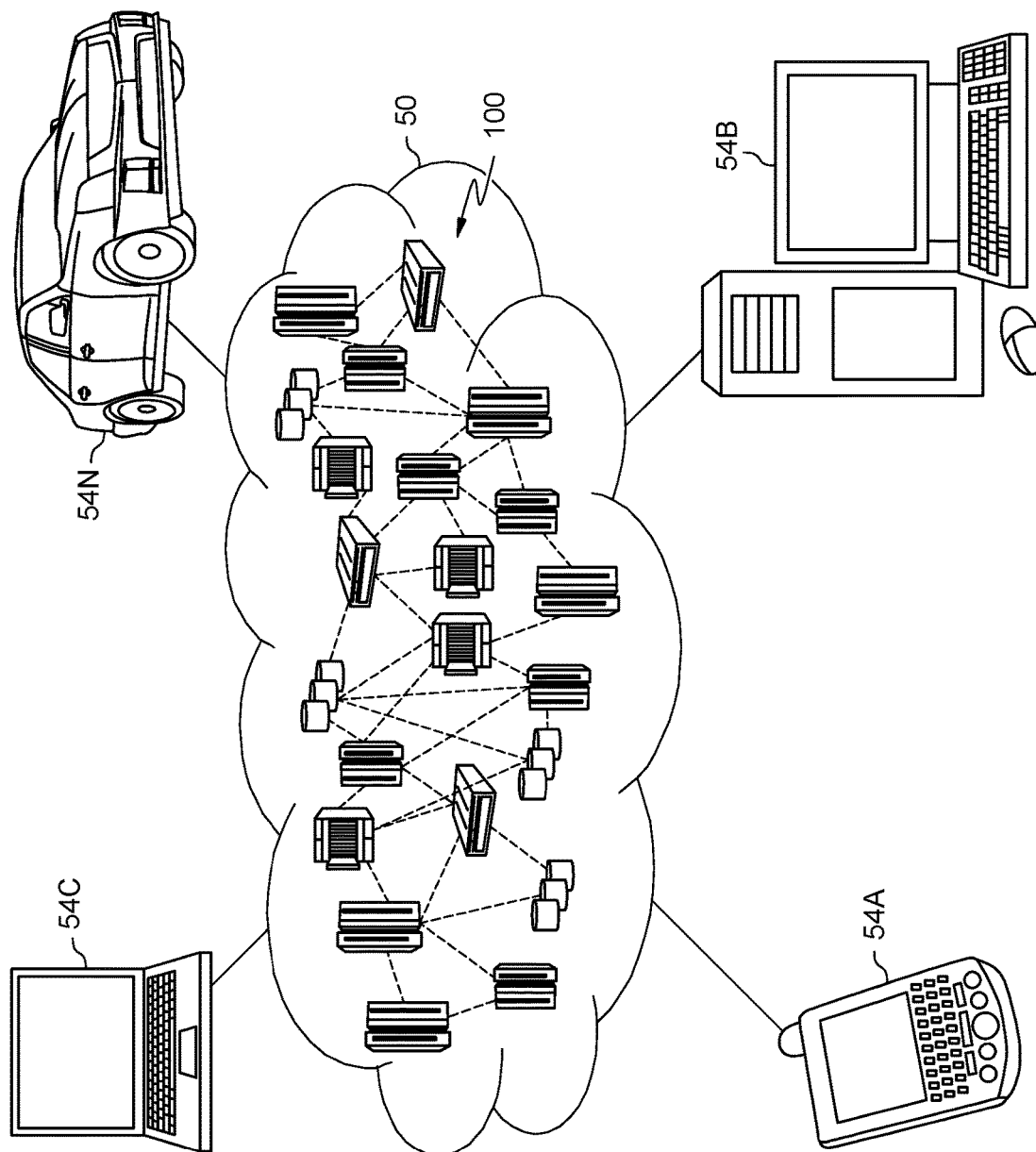
FIG. 5 depicts a cloud computing environment according to an embodiment of the present invention.

Referring now to FIG. 5, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 100 and cloud computing environment 50 can communicate with any type of computerized device over any type of network and/or network addressable connection (e.g., using a web browser).

Figure 6:
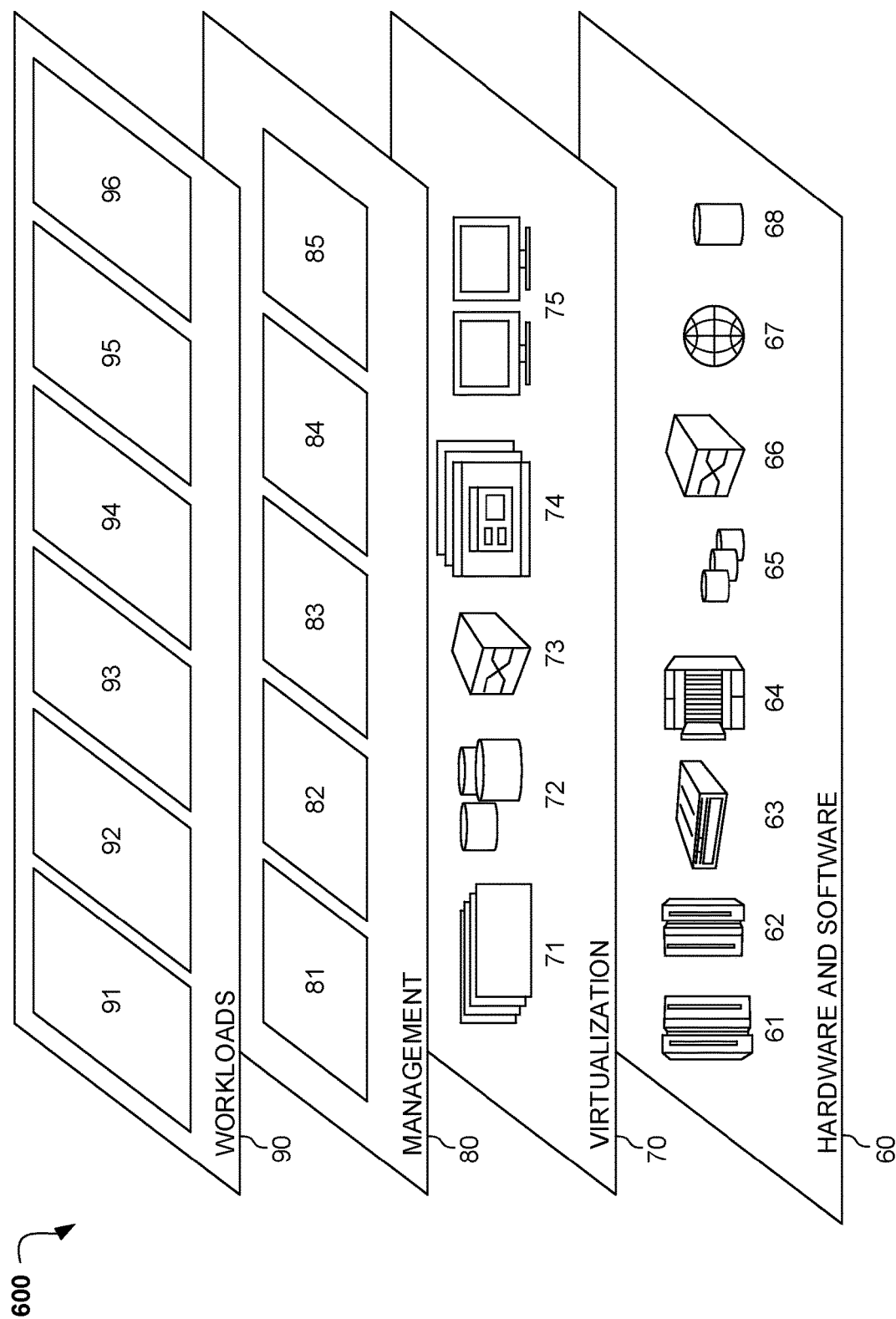
FIG. 6 depicts abstraction model layers according to an embodiment of the present invention.

Referring now to FIG. 6, a set of functional abstraction layers 600 provided by cloud computing environment 50 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and ancillary speech generation 96. Ancillary speech generation 96 may relate to accepting user queries for which a natural language processing program has no confident answer, assembling reformulated queries based on context clues, pruning reformulated queries that do not match user interests, and providing an answer using a knowledge graph.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for generating ancillary speech in response to one or more natural language queries, the method comprising:
    receiving a query from a querent;
    interpreting the one or more terms of the received query using a plurality of schema information;
    rewriting the initial query into a plurality of related queries;
    pruning one or more related queries from the plurality of related queries on at least one of one or more contemporary circumstances;
    retrieving one or more preferences associated with the querent, where each of the one or more preferences is assigned a weight representing an importance of each preference to the querent;
    filtering out one or more of the one or more pruned related queries that do not match the one or more preferences;
    sorting the one or more filtered pruned related queries according to the weight of each matching preference; and
    based on the sorting, answering a pruned query of the one or more filtered pruned related queries with a knowledge graph.

2. The method of claim 1, further comprising:
    based on determining a query has been previously asked by the querent, retrieving one or more precomputed answers to the previously asked query instead of answering the one or more queries with the knowledge graph.

3. The method of claim 1, wherein the one or more weights and the one or more preferences are selected in response to a change from one or more prior queries of the querent using a reinforcement learning mechanism.

4. The method of claim 1, wherein the one or more preferences are selected from a group consisting of a plurality of social media information, a plurality of querent-entered information, one or more online profiles, and one or more online databases.

5. The method of claim 1, further comprising:
    gathering a plurality of real-time cognitive feedback comprising one or more elements selected from a group consisting of one or more facial expressions, one or more vocal cues, a plurality of biometrics, one or more physical movements, a stance, and a number of individuals present.

6. The method of claim 1, wherein a virtual affect or a virtual avatar are modified in response to one or more internal or external factors.

7. A computer system for generating ancillary speech in response to one or more natural language queries, the computer system comprising:
    one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is configured to perform a method comprising:
    receiving a query from a querent;
    interpreting the one or more terms of the received query using a plurality of schema information;
    rewriting the initial query into a plurality of related queries;

pruning one or more related queries from the plurality of related queries on at least one of one or more contemporary circumstances;

retrieving one or more preferences associated with the querent, where each of the one or more preferences is assigned a weight representing an importance of each preference to the querent;

filtering out one or more of the one or more pruned related queries that do not match the one or more preferences;

sorting the one or more filtered pruned related queries according to the weight of each matching preference; and based on the sorting, answering a pruned query of the one or more filtered pruned related queries with a knowledge graph.

8. The computer system of claim 7, wherein the method further comprises:

based on determining a query has been previously asked by the querent, retrieving one or more precomputed answers to the previously asked query instead of answering the one or more queries with the knowledge graph.

9. The computer system of claim 7, wherein the one or more weights and the one or more preferences are selected in response to a change from one or more prior queries of the querent using a reinforcement learning mechanism.

10. The computer system of claim 7, wherein the one or more preferences are selected from a group consisting of a plurality of social media information, a plurality of querent-entered information, one or more online profiles, and one or more online databases.

11. The computer system of claim 7, wherein the method further comprises:

gathering a plurality of real-time cognitive feedback comprising one or more elements selected from a group consisting of one or more facial expressions, one or more vocal cues, a plurality of biometrics, one or more physical movements, a stance, and a number of individuals present.

12. The computer system of claim 7, wherein the method further comprises:

modifying a virtual affect or a virtual avatar in response to one or more internal or external factors.

13. A computer program product for generating ancillary speech in response to one or more natural language queries, the computer program product comprising:

one or more computer-readable tangible storage medium and program instructions stored on at least one of the one or more tangible storage medium, the program instructions executable by a processor to cause the processor to perform a method comprising:

receiving a query from a querent;

interpreting the one or more terms of the received query using a plurality of schema information;

rewriting the initial query into a plurality of related queries;

pruning one or more related queries from the plurality of related queries on at least one of one or more contemporary circumstances;

retrieving one or more preferences associated with the querent, where each of the one or more preferences is assigned a weight representing an importance of each preference to the querent;

filtering out one or more of the one or more pruned related queries that do not match the one or more preferences;

sorting the one or more filtered pruned related queries according to the weight of each matching preference; and based on the sorting, answering a pruned query of the one or more filtered pruned related queries with a knowledge graph.

14. The computer program product of claim 13, further comprising:

based on determining a query has been previously asked by the querent, retrieving one or more precomputed answers to the previously asked query instead of answering the one or more queries with the knowledge graph.

15. The computer program product of claim 13, wherein the one or more weights and the one or more preferences are selected in response to a change from one or more prior queries of the querent using a reinforcement learning mechanism.

16. The computer program product of claim 13, wherein the one or more preferences are selected from a group consisting of a plurality of social media information, a plurality of querent-entered information, one or more online profiles, and one or more online databases.

17. The computer program product of claim 13, further comprising:

gathering a plurality of real-time cognitive feedback comprising one or more elements selected from a group consisting of one or more facial expressions, one or more vocal cues, a plurality of biometrics, one or more physical movements, a stance, and a number of individuals present.

18. The computer program product of claim 13, wherein a virtual affect or a virtual avatar are modified in response to one or more internal or external factors.

* * * * *